United States Patent
Ashwood Smith

(10) Patent No.: US 8,838,692 B2
(45) Date of Patent: *Sep. 16, 2014

(54) DISTRIBUTION OF XML DOCUMENTS/MESSAGES TO XML APPLIANCES/ROUTERS

(71) Applicant: Rockstar Consortium US LP, Plano, TX (US)

(72) Inventor: Peter Ashwood Smith, Hull (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,608

(22) Filed: Sep. 6, 2013

(65) Prior Publication Data
US 2014/0006514 A1   Jan. 2, 2014

Related U.S. Application Data

(63) Continuation of application No. 13/679,276, filed on Nov. 16, 2012, now Pat. No. 8,533,267, which is a continuation of application No. 11/512,854, filed on Aug. 30, 2006, now Pat. No. 8,321,507.

(51) Int. Cl.
*G06F 15/16* (2006.01)

(52) U.S. Cl.
USPC .......................................... 709/204; 709/251

(58) Field of Classification Search
None
See application file for complete search history.

(56) References Cited

U.S. PATENT DOCUMENTS

| | | | |
|---|---|---|---|
| 5,636,205 A | 6/1997 | Suzuki et al. | |
| 7,680,136 B2 | 3/2010 | Miyazaki et al. | |
| 7,895,256 B2 | 2/2011 | Zombek et al. | |
| 7,903,670 B2 | 3/2011 | Ha et al. | |
| 8,533,267 B2 * | 9/2013 | Ashwood Smith | 709/204 |
| 2005/0188039 A1 | 8/2005 | Charters et al. | |
| 2006/0106916 A1 * | 5/2006 | Paparella et al. | 709/216 |

OTHER PUBLICATIONS

Clark, James et al., "XML Path Language (XPath) Version 1.0," W3C, Nov. 16, 1999, 37 pages.
Huang, Min, "A performance comparison of tree and ring topologies in distributed system," Master's Thesis, Iowa State University, 2004, 58 pages, Ames, Iowa.
Non-Final Office Action for U.S. Appl. No. 11/512,854, mailed Jan. 27, 2009, 12 pages.
Final Office Action for U.S. Appl. No. 11/512,854, mailed Oct. 26, 2009, 14 pages.
Advisory Action for U.S. Appl. No. 11/512,854, mailed Feb. 23, 2010, 3 pages.

(Continued)

*Primary Examiner* — Afshawn Towfighi
(74) *Attorney, Agent, or Firm* — Withrow & Terranova, PLLC

(57) ABSTRACT

XML appliances/routers may be organized to implement one or more XML distribution rings to enable XML documents/messages to be distributed efficiently. The rings may be logical or physical. The XML distribution rings enable the XML documents/messages to be exchanged without requiring the XML appliances/routers to run a routing protocol to determine how XML documents/messages should be distributed through the network. Documents may be transmitted in one way on the ring or may be transmitted in both directions around the ring to enable the ring to tolerate failure of an XML appliance/router. Each XML appliance/router will receive all XML documents/messages and will make routing decisions for those clients that have provided the XML appliance/router with XML subscriptions. The subscriptions may be formed according to the XPath standard or in another manner.

19 Claims, 3 Drawing Sheets

(56) References Cited

OTHER PUBLICATIONS

Non-Final Office Action for U.S. Appl. No. 11/512,854, mailed May 7, 2010, 15 pages.
Final Office Action for U.S. Appl. No. 11/512,854, mailed Dec. 21, 2010, 21 pages.
Advisory Action for U.S. Appl. No. 11/512,854, mailed Apr. 22, 2011, 3 pages.
Non-Final Office Action for U.S. Appl. No. 11/512,854, mailed Jul. 15, 2011, 15 pages.
Final Office Action for U.S. Appl. No. 11/512,854, mailed Jan. 10, 2012, 16 pages.
Notice of Allowance for U.S. Appl. No. 11/512,854, mailed Jul. 24, 2012, 10 pages.
Notice of Allowance for U.S. Appl. No. 13/679,276, mailed May 9, 2013, 12 pages.

* cited by examiner

DISTRIBUTION OF XML DOCUMENTS/MESSAGES TO XML APPLIANCES/ROUTERS

CROSS-REFERENCE TO RELATED APPLICATIONS

This application is a continuation of U.S. application Ser. No. 13/679,276, entitled DISTRIBUTION OF XML DOCUMENTS/MESSAGES TO XML APPLIANCES/ROUTERS, which was filed on Nov. 16, 2012; which was a continuation of U.S. application Ser. No. 11/512,854, entitled DISTRIBUTION OF XML DOCUMENTS/MESSAGES TO XML APPLIANCES/ROUTERS, which was filed on Aug. 30, 2006, and which issued on Nov. 27, 2012 as U.S. Pat. No. 8,321,507, the disclosures of which are incorporated herein by reference in its entirety.

BACKGROUND

1. Field

This application relates to communication networks and, more particularly, to the distribution of XML documents/messages by XML appliances/routers from publishers to subscribers.

2. Description of the Related Art

Data communication networks may include various network elements, such as routers and switches, configured to facilitate the flow of data through the network. Networks may also include other network elements, such as computers and printers, configured to transmit and receive data over the network.

Network elements may have different levels of intelligence, depending on the particular manner in which the network element is intended to operate on the network. For example, a network element may be relatively intelligent and configured to execute software to enable particular' applications to be run on the network element, so that the network element can provide services on the network. Alternatively, the network element may be provided with less intelligence and configured to perform a particular service on the network. An example of a less intelligent network element may be a printer connected to the network and configured to provide print services on the network. Optionally, different network elements may work together to collectively provide services on the network. As networks have developed, it has become possible to provide a greater variety of services on the networks.

XML (eXtensible Markup Language) documents/messages may be used to describe network services and to describe other types of information. XML provides a flexible manner to describe services and other information, yet is able to maintain a hierarchical structure. Since XML is well known, a detailed description of XML will not be provided.

Network elements may specify the type of XML documents/messages that are of interest by describing the structure and content of the XML documents/messages. One common way of describing XML documents/messages is to use a common access language referred to generally as XPath. XPath is a standard that has been confirmed by the World Wide Web Consortium (W3C) as a common language to access XML documents/messages. XPath is described in greater detail in *XML Path Language XPath Version* 1.0, the content of which is hereby incorporated by reference.

XPath may be used to enable a network element to specify which documents/messages a particular user or network element is interested in. This is referred to herein as a subscription. The XPath request will be sent to an XML appliance on the network, which will compare the XPath request against documents/messages that are received at the XML appliance. When the XML appliance receives a document/message that matches the XPath request, it will pass the document/message to the network element that made the request. More generally, when a document/message is published, the XML appliance may look at the structure and content of the documents/messages, compare the published document with known subscription requests, and forward the XML documents/messages to any network element that has expressed an interest in receiving documents of that nature. Thus, an XML document/message may be forwarded to interested applications/users without requiring the publishing network element to address the XML document/message to those applications/users. This is advantageous in that it enables XML documents/messages to be forwarded without requiring the publishing network element to learn the identity/address of the interested applications/users.

Since the structure/content of the XML document/message is used to direct the data through the network to subscribers that are interested in receiving that content, XML is in effect used to route data on the network. This type of routing will be referred to herein as XML routing. XML appliances on the network may be used to perform XML routing so that XML documents/messages may be routed to subscribers based on their content. XML appliances that make muting decisions based on XML content will be referred to herein as XML appliances/routers. Subscribers may advertise subscriptions to particular XML content (using an XPath expression) and the subscriptions may be forwarded to the XML appliances/routers. When an XML appliance/router receives an XML document/message matching an XML subscription, it will forward the XML document/message toward the subscriber.

FIG. 1 shows an example of a communication network 10 in which an XML appliance 12 is configured to make routing decisions with respect to XML information published by XML publishers 14 and subscribed to by XML subscribers 16. In the embodiment shown in FIG. 1, the XML publishers 14 include one or more servers 18 and the XML subscribers include one or more clients 20. The XML publishers and subscribers, of course, may be network devices other than servers and clients.

Clients 20 may be interested in XML content of a particular type. This interest may be formatted as an XPath subscription request that is then passed to the XML appliance. As XML documents/messages are received by the XML appliance, the XML appliance will check the XML documents/messages against the XPath subscription requests and make routing decisions to forward the XML documents/messages to the interested XML subscribers. Many different matching processes may be used to compare the XML documents/messages against the XPath rules associated with the XPath subscription requests.

XML rules associated with XML subscription requests may be contained in an XML muting table 22 or other memory structure that may be used by the XML appliance to correlate an XPath match with a particular routing decision. For example, the XML appliance may include a table in which entries in the table correlate XPath expression with output port, XPath expression and output interface, XPath expression with tunnel interface, or some other correlation between XPath expression and forwarding action. The muting table will then be used by the XML appliance/router to make XML routing decisions with respect to received XML documents/messages.

FIG. 2 shows an example of a number of XML appliances 12 interconnected to form an XML network. The physical network 13 over which the XML appliances communicate is independent of the network of XML appliances and will be assumed to be capable of interconnecting the XML appliances. Thus, the XML appliances 12 may be physically connected to each other via direct wires, wireless links, or via intermediate network elements such as routers and switches. Data may be tunneled between the XML appliances or otherwise carded by the underlying physical network in any convenient manner, and the network of XML appliances thus may be considered to be independent of the underlying physical network. For example, the XML appliances may be distributed within a larger network such as a LAN, WAN, or the Internet, and interconnected via switches, routers, or other types of network elements. The XML appliances, in this type of network, may exchange information that is then carried, as appropriate, by the underlying physical network interconnecting the XML appliances.

In the example shown in FIG. 2, the XML publishers and XML subscribers are the same as shown above in connection with FIG. 1. However, the intermediate XML network includes a plurality of XML appliances that are interconnected in a mesh or other network arrangement. Specifically, as shown in FIG. 2, the XML appliances have IP addresses 1.1.1.1 through 1.1.1.10. The subscribers are associated with network elements that are connected to XML appliances having IP addresses 1.1.1.7 through 1.1.1.10. Each of the subscribers may request access to XML content by submitting onto the XML network a set of XPath rules that will be transmitted between the XML appliances/routers as XML subscription requests. The XML subscription requests will be distributed throughout the XML network to the XML appliances to enable the XML appliances to make XML routing decisions.

In the embodiment shown in FIG. 2, two examples of XML routing tables have been shown associated with XML appliance 1.1.1.2. Specifically, the first XML muting table 22A shows that content matching XPath rules 1 and 2 should be forwarded to XML appliance 1.1.1.4 while XML content matching XPath rules 3 and 4 should be forwarded using XML appliance 1.1.1.3. This type of correlation may be useful for ingress routing, and optionally other types of XML muting. The example of FIG. 2 also shows a second possible way in which the rules may appear in the XML routing table, in which the XML routing tables designate the end point of a tunnel for the XML content. Specifically, as shown in FIG. 2, the XML routing table 22B may contain a correlation between rule 1 and the destination IP address 1.1.1.10. This enables the content to be tunneled through the network from an XML appliance that makes a decision to the destination of that traffic.

To enable XML appliances/routers to make decisions as to how XML content should be forwarded, the XML appliances/routers have conventionally distributed XML subscription information and built forwarding tables containing XPath expressions. Depending on the configuration of the XML network and the manner in which it the network was set up, XML routing decisions may be made at the ingress to the XML network (by the XML appliance that first receives the XML content), at the egress from the XML network (where the XML content is destined to leave the XML network), by the intermediate XML appliances/routers, or at some other way. XML routes may also be aggregated, hashed, or otherwise manipulated as well to enable efficient decision-making by the XML appliances/routers.

When a subscriber submitted a new XML subscription or modified a previous XML subscription, the XML subscription may be advertised to the XML appliances/routers using a standard routing protocol such as Open Shortest Path First (OSPF) or Border Gateway Protocol (BOP). However, flooding the network with XML subscriptions may consume significant network overhead, since XML subscriptions may change much more frequently than traditional routing information changes and the amount of information that is required to be transmitted may be much larger than traditional routing information, which may cause the XML routing tables to become rather large.

SUMMARY OF THE DISCLOSURE

As described in greater detail below, XML appliances/routers may be organized into one or more physical or logical ring structures to enable the XML appliances/routers to exchange XML documents/messages in a well defined and low cost manner. The ring structure enables each XML appliance/router to receive XML documents/messages so that it is able to make routing decisions to determine whether any subscribers have expressed an interest in that XML document/message. The XML documents/messages may be passed in one direction around the ring or may be passed in both directions around the ring. When a break in the ring occurs, the XML documents/messages may be passed in the other direction around the ring to enable the XML documents/messages to reach all participants on the ring regardless of the break. The rings may be formed to be logical such as by configuring tunnels between the XML appliances/routers, or may be physical such as by configuring connections between the XML appliances/routers. Other ways of forming the rings may be used as well as discussed in greater detail below.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

By arranging XML appliances/routers to implement one or more XML distribution rings, the XML appliances/routers can distribute XML documents/messages efficiently. Each XML, appliance/router will therefore receive all XML documents/messages and will make routing decisions for those clients that have provided the XML appliance/router with XML subscriptions. The subscriptions may be formed according to the XPath standard or in another manner and the invention is not limited to the particular way in which clients subscribe to receive XML documents/messages. The XML distribution rings enable the XML documents/messages to be exchanged without requiring the XML appliances/routers to run a routing protocol to determine how XML documents/messages should be distributed through the network. For example, because the XML appliances/routers am arranged in one or more ring structures, the XML appliances/routers do not need to run a routing protocol to form a logical spanning tree structure.

Figure 1:
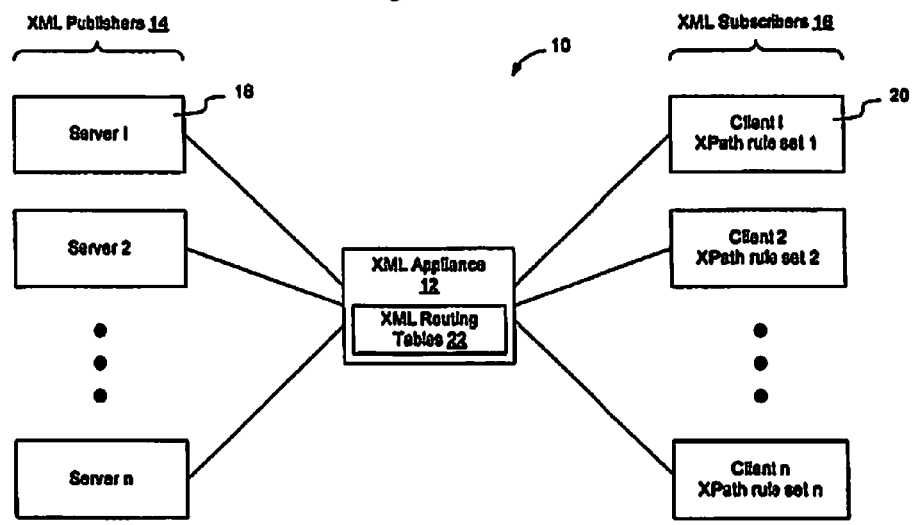
FIG. 1 illustrates an example of a communication network having an XML appliance configured to interconnect XML publishers and XML subscribers.
Figure 2:
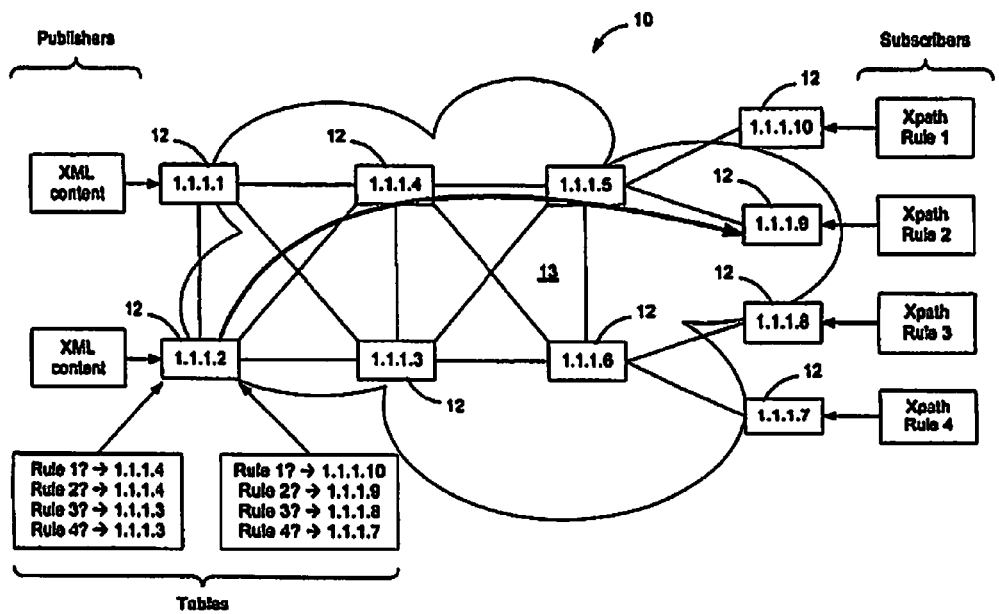
FIG. 2 illustrates a communication network including multiple XML appliances configured to interconnect XML publishers and XML subscribers.
Figure 3:
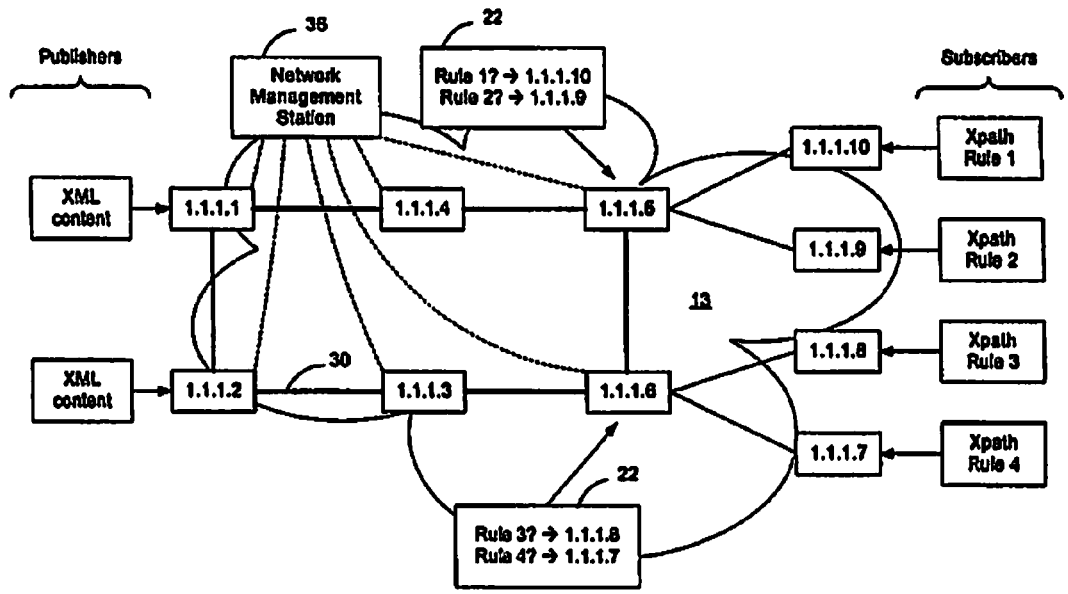
FIGS. 3-5 illustrate examples of communication networks including multiple XML appliances organized in a ring configured according to an embodiment of the invention.

FIG. 3 illustrates an example of a logical XML distribution ring 30 in an XML network such as the XML network shown in FIG. 2. As shown in FIG. 3, the XML distribution ring enables XML appliances/routers to forward XML documents/messages to each other on the network and apply local subscription rules to the XML documents to route the XML documents to interested subscribers. In the embodiment shown in FIG. 3, a subscriber associated with XML appliance/router 1.1.1.10 is interested in receiving XML documents/messages that match XPath rule 1. Similarly, a subscriber associated with XML appliance/router 1.1.1.9 is interested in receiving XML documents/messages that match XPath rule 2. XML appliances/routers 1.1.1.10 and 1.1.1.9 are not on a logical distribution ring, however, so they will forward the XPath rules to an adjacent XML appliance/router until the rules are received by an XML appliance/router that is on an XML document/message distribution ring. In the illustrated example, XML appliance/router 1.1.1.5 is on an XML document/message distribution ring 30, and accordingly the rules (rule 1 and rule 2) will be programmed into that XML appliance/router's forwarding table 31.

When XML content such as an XML document/message enters the XML document/message distribution ring, it will be passed in one direction or in both directions around the ring so that XML appliances/routers on the ring may receive the XML content. The XML distribution ring enables XML appliances/routers to have a defined way in which to exchange XML documents/messages so that XML subscriptions need not be advertised or broadcast on the network. Additionally, having the XML distribution ring defined in this manner enables the XML appliances routers to forward XML content without running a routing protocol that could then be used to calculate a distribution tree. The use of a ring structure also may provide redundancy where the ring is bi-directional, so that a failure of one of the XML appliances/routers will not prevent other XML appliances/routers from receiving the XML documents/messages.

Table I below shows several possible distribution orders that may be used to transmit XML documents/messages around the example ring:

TABLE I

| Example No. | Distribution order |
| --- | --- |
| 1 | 1.1.15 → 1.1.1.4 → 1.1.1.1 → 1.1.1.2 → 1.1.1.3 → 1.1.1.6 → 1.1.1.5 |
| 2 | 1.1.15 → 1.1.1.6 → 1.1.1.3 → 1.1.1.2 → 1.1.1.1 → 1.1.1.4 → 1.1.1.5 |
| 3 | 1.1.15 → 1.1.1.4 → 1.1.1.1 → 1.1.1.2 → 1.1.1.3 → 1.1.1.6 → 1.1.1.5 and 1.1.15 → 1.1.1.6 → 1.1.1.3 → 1.1.1.2 → 1.1.1.1 → 1.1.1.4 → 1.1.1.5 |
| 4 | 1.1.15 → 1.1.1.4 → 1.1.1.1 → 1.1.1.2 and 1.1.15 → 1.1.1.6 → 1.1.1.3 → 1.1.1.2 |

As shown in Table I, there are several ways in which XML documents/messages may be transmitted around the XML distribution ring. In Example No. 1, XML documents/messages are distributed in a counterclockwise direction around the logical ring of XML appliances/routers. In Example No. 2, the XML documents/messages are distributed clockwise. In both examples 1 and 2, when the XML documents/messages reaches the XML appliance/router that originated the distribution, they will stop and not be further forwarded on the ring. This prevents XML documents/messages from continuing to circle the logical XML distribution ring. Additionally, this enables the original XML appliance/router to confirm that all XML appliances/routers on the ring have received the XML documents/messages.

In Example Nos. 3 and 4, the XML documents/messages are distributed in both directions starting at the XML appliance/router where the XML documents/messages entered the ring. The XML documents/messages may traverse all the way around the ring to the originating XML appliance/router as shown in Example No. 3, or transmission of the XML documents/messages may be terminated once it catches up with the same information being transmitted the other way on the logical XML distribution ring as shown in Example No. 4. In either instance, the XML appliance/router that terminates distribution of the XML documents/messages is able to ensure that all other XML appliances/routers have seen the XML document/message, the distribution of which is being terminated.

Termination of distribution of the XML documents/messages on the ring in Example No. 4 may be enabled in many ways, for example by causing the XML appliances/routers to check whether a received XML document/message is a duplicate of a XML document/message that was previously forwarded by the XML appliance router. By not forwarding duplicate XML documents/messages, the amount of XML documents/messages being forwarded around the ring may be reduced. Other ways of terminating distribution around the ring may be used as well, such as by counting hops that the XML document/message has taken on the ring, looking for XML documents/messages from a particular XML appliance/router, or in other ways.

Figure 4:
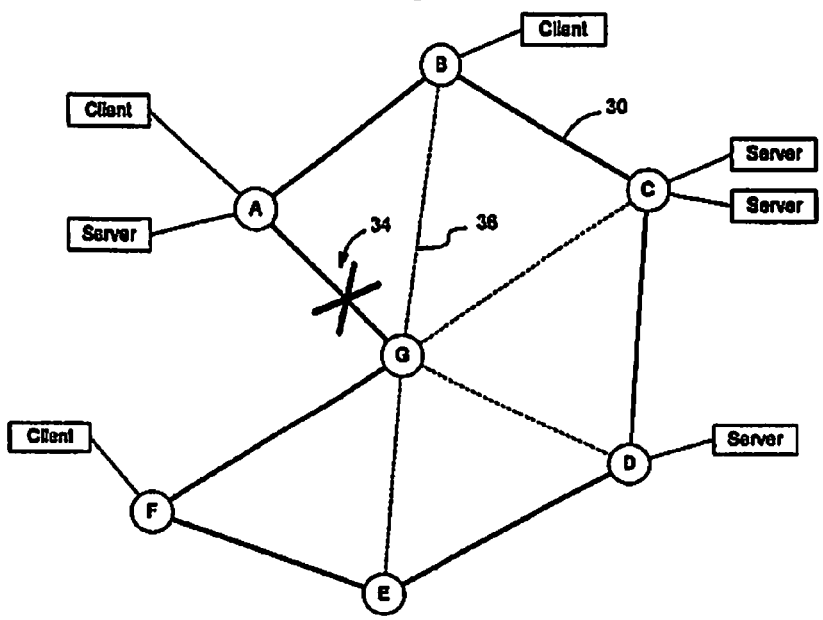

FIG. 4 shows an example of an XML distribution ring in which a failure 34 has occurred between XML appliances/routers A and G. Although the XML appliances/routers may be interconnected by an underlying physical network having failure protection mechanisms, and thus a failure on the logical ring may be expected to occur relatively infrequently, a failure may still occur that would require XML documents/messages to propagate in both directions around the ring. For example, one of the XML appliances/routers may fail which would break the ring and require the XML documents/messages to propagate in both directions around the ring.

In the example shown in FIG. 4, assume that XML document/message is passed onto the ring via XML appliance/ router B. If the ring is configured to transmit the XML documents/messages clockwise, the XML documents/messages will be passed to XML appliances/routers C, D, E, F, and G. However, the failure 34 will prevent the XML documents/messages from reaching XML appliance/router A.

To enable the distribution ring to tolerate failure, the original sending XML appliance/router B may be configured to maintain state information for each XML document/message transmission and wait to receive a matching transmission on the ring. When the original sending XML appliance/router receives a copy of the XML document/message, it knows that the transmission has traversed the entire ring and that all of the XML appliances/routers on the ring have received the transmission. If the original sending XML appliance/router does not receive a confirming transmission, the original XML sending router may transmit the same transmission in the other direction on the ring to enable the transmission to traverse the ring in the other direction until it reaches a break in the ring. This process will enable a logical XML ring to tolerate a break in the XML ring. In the illustrated example, if XML appliance/router B does not receive a duplicate transmission confirming the ring is in-tact within a given time period, XML appliance/router B may re-transmit the duplicate XML documents/messages transmission in the other direction on the ring which, in this example, is toward XML appliance/router A.

Alternatively, XML appliances/routers may be configured to determine when there is a break in the XML distribution ring such as by issuing confirmations or other connection keep-alive messages. Where an XML appliance/router determines that there is a failure on the XML distribution ring, the XML appliance/router may be configured to re-transmit the XML documents/messages transmission in the opposite direction on the ring to cause the XML documents/messages transmission to go the other way on the ring to reach the XML appliances/routers on the opposite side of the break.

XML appliances/routers use subscription information to forward XML documents/messages to local subscribing clients. The subscription information may be in the form of an XPATH expression, a textual pattern matching language such as General Regular Expression Parser (GREP) or which may take another form. The subscribers may be locally attached or may be attached to the XML distribution ring via one or more intermediate XML appliances/routers.

Figure 5:
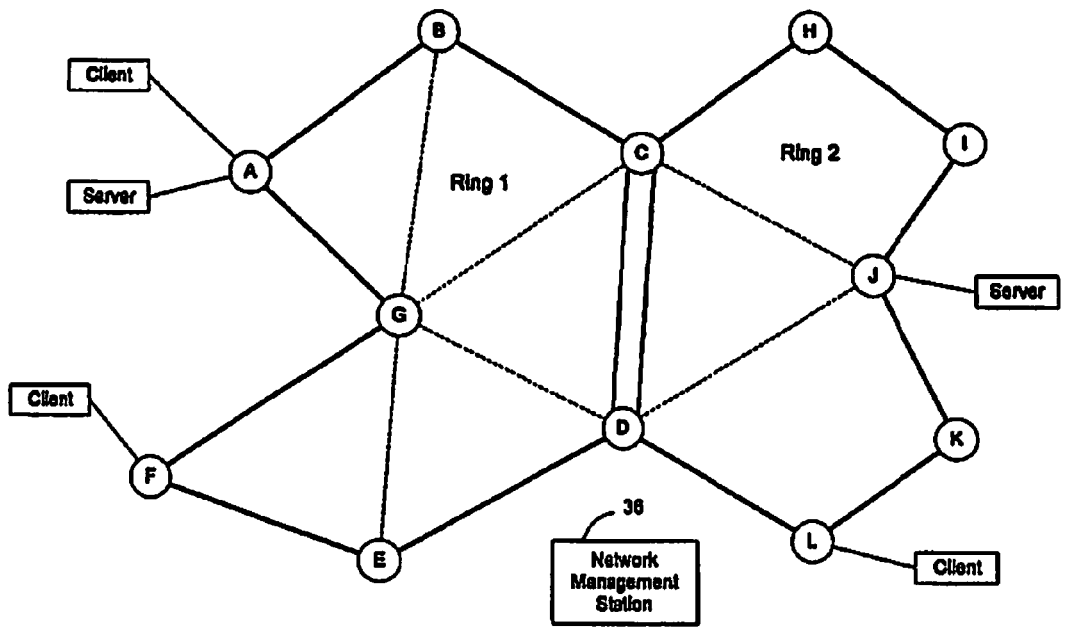

A given network may grow to be relatively large such that it may not be practical to have a single logical XML distribution ring including all of the XML appliances/routers on the network. Accordingly, as shown in FIG. 5, multiple XML distribution rings may be implemented to enable distribution of XML documents/messages to the XML appliances/routers on a network. In the example illustrated in FIG. 5, a network including XML appliances/routers A-L has two rings—a first ring which is similar to the ring discussed in connection with FIG. 4 (Ring 1=A, B, C, D, E, F, G, A) and a second ring (Ring 2) including routers C, H, I, J, K, L, D, C. Clients and servers may be located on either ring.

When an XML document/message is transmitted on one of the rings and reaches a router that is on more than one ring, that XML appliance/router will transmit the XML document/message onto all of the rings of which it is a member. Thus, for example, when XML appliance/router C receives an XML document/message from XML appliance/router B on ring 1, it will transmit the XML document/message both to XML appliance/router D on Ring 1 and to XML appliance/router H on Ring 2. In connection with this, the manner in which the two rings are configured to transmit XML documents/messages may make a difference as to how the XML appliances/routers behave. For example, if Ring 1 is configured to distribute XML documents/messages clockwise and Ring 2 is configured to distribute XML documents/messages counter-clockwise, XML appliance/router C may simply pass the XML document/message to XML appliance/router D since XML appliance/router C is not a transmission junction between the two rings. At XML appliance/router D, in this example, the distribution of XML documents/messages would diverge, however, and XML appliance/router D may be configured to transmit copies of the XML documents/messages on both XML distribution rings. Thus, in this example, XML appliance/router D would be configured to transmit a copy of the XML document/message to XML appliances/routers E and L.

As shown in FIG. 5, each ring may be operated independent of the other rings on the network. When XML documents/messages are transmitted from one ring to another, the XML appliance/router that first transmits the XML document/message on the ring will be considered the originating router for that information on the ring to ensure that the information reaches all XML appliances/routers on the ring.

Although two rings have been illustrated in this example network, the invention is not limited in this manner as any number of rings may be used to transmit XML documents/messages on the network. The number of nodes on a ring may vary depending on the rate at which the XML documents/messages are able to be retransmitted by the XML appliances/routers and the amount of time the network can tolerate between initial transmission of XML documents/messages to the ultimate reception of the XML documents/messages by all of the XML appliances/routers on the network. For example, the rings may have between 5 and 20 XML appliances/routers, although the invention is not limited to this particular range.

The XML appliances may be commonly available XML appliances/routers such as the DataPower XS40 XML Secure Gateway. The invention is not limited in this manner, however, as other XML appliances/routers, both in existence and to be developed, may be used in connection with embodiments of the invention to enable XML documents/messages to be distributed on a network of XML appliances/routers.

The rings of XML appliances/routers on the network may be established using network management software running on a network management station 36 interfacing with the XML appliances/routers for example via Simple Network Management Protocol (SNMP). Configuration of the rings may be established by setting MIB variables indicative of how XML documents/messages should be forwarded by an XML appliance/router or by setting values in the routing tables of the XML appliances/routers to cause the XML documents/messages to be forwarded to implement the XML rings. The invention is not limited to these several described ways of programming the XML appliances/routers to establish the XML content distribution rings as other ways of causing the XML appliances/routers to implement the rings may be used as well.

Figure 6:
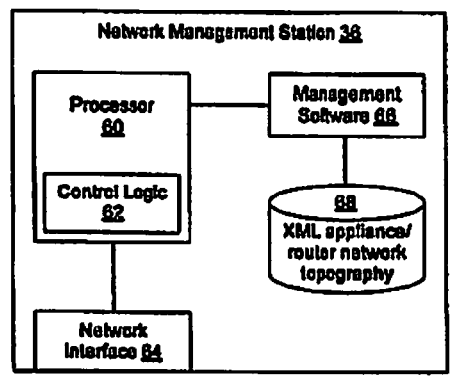
FIG. 6 is a functional block diagram of a network management station configured to interface with XML appliances/routers to implement XML distribution rings according to an embodiment of the invention.

FIG. 6 illustrates an example of a network management station including network management software configured to implement XML distribution rings on a network of XML appliances/routers. As shown in FIG. 6, the network management station 36 may be implemented as a computer/server on a network that includes a processor 60 including control logic 62. The control logic may be configured to implement management software 66 to enable the management station to interact with and program the XML appliances/routers. The management software may be configured, for example, to establish the XML distribution ring(s) by instructing the XML appliances/routers how to forward XML documents/messages on the network of XML appliances/routers. The management software may interface a database of XML appliance/router network topography so that the management software or a network administrator using the management software may determine how the XML distribution rings should be formed on the network.

The management station 36 may also include many other functional aspects that are commonly associated with computers/servers, such as a network interface 64 and other common functional components. The invention is not limited to the particular hardware platform chosen to implement the network management station as many different types of network elements may be used to implement the network management station.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation but rather extends to all manners of implementing the functions described herein in connection with XML appliances/routers on an XML network.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network of XML appliances/routers for distributing XML documents/messages, the network comprising:
   a plurality of XML appliances/routers implemented as processes in separate physical computer systems and configured:
     to make XML routing decisions for XML documents/messages by applying XML subscription information to the XML documents/messages; and
     to forward the XML documents/messages toward subscribing clients according to the XML subscription information submitted by the subscribing clients, subsets of the subscribing clients being coupled to the XML appliances/routers via respective originating XML appliances/routers; and
   a plurality of communication links interconnecting the plurality of XML appliances/routers in at least one distribution ring established for the distribution of XML documents/messages between the XML appliances/routers, the at least one distribution ring comprising a plurality of the XML appliances/routers arranged serially in a ring and configured to transmit XML documents/messages from XML appliance/router to XML appliance/router around the ring;
   wherein:
   respective originating XML appliances/routers are configured to transmit/publish XML documents/messages onto the ring; and
   the XML appliances/routers on the distribution ring are configured:
     to receive XML subscription information from a respective subset of subscribing clients;
     to locally apply the subscription information to each XML document/message received on the distribution ring;
     to select XML documents/messages to be forwarded toward its subset of subscribing clients without exchanging XML subscription information between the XML appliances/routers; and
     to forward the selected XML documents/messages toward subscribing clients according to the XML subscription information submitted by subscribing clients.

2. The network of claim 1, wherein enabling the respective XML appliances/routers the XML appliances/routers are configured to transmit the XML documents/messages in either or both directions around the ring upon receipt of the XML documents/messages.

3. The network of claim 1, wherein an originating XML appliance/router that has transmitted/published a respective XML document/message onto the distribution ring is operable to terminate the transmission of the respective XML document/message around the ring.

4. The network of claim 1, wherein an XML appliance/router that has determined that all other XML appliances/routers on the distribution ring are likely to have seen a respective XML document/message is operable to terminate transmission of the respective XML document/message.

5. The network of claim 1, wherein the at least one distribution ring in the network of XML appliances/routers is established administratively.

6. The network of claim 5, wherein the at least one distribution ring in the network of XML appliances/routers is established via a network management program interfacing the XML appliances/routers via Simple Network Management Protocol (SNMP).

7. The network of claim 1, wherein the distribution ring is a logical distribution ring.

8. The network of claim 7, wherein the XML appliances/routers are interconnected via a physical network including intermediate network elements, and wherein the XML appliances/routers are configured to transmit the XML documents/messages from XML appliance/router to XML appliance/router by tunneling the XML documents/messages across the physical network.

9. The network of claim 1, wherein the subscription information comprises at least one of an XPATH expression and an expression created using a textual pattern matching language.

10. The network of claim 1, comprising two distribution rings, at least one XML appliance/router being common to the two distribution rings and being configured to forward an XML document/message received on one of the two distribution rings on both of the two distribution rings.

11. The network of claim 10, wherein the at least one XML appliance/router that is common to the two distribution rings is configured to operate as an originating router with respect to one of the distribution rings for XML documents/messages that it first transmits to that one of the distribution rings.

12. The network of claim 1, comprising a network management device adapted to configure the plurality of XML appliances/routers in the at least one distribution ring.

13. The network of claim 12, wherein the network management device is adapted:
   to configure the plurality of XML appliances/routers in a bidirectional continuous loop such that only XML appliances/routers of the plurality of XML appliances/routers that are directly adjacent to each other are operatively coupled to establish an XML distribution ring;

to configure the originating XML appliances/routers to provide XML messages to the distribution ring for clients, such that each of the plurality of XML appliances/routers in the bidirectional continuous loop has at least one of a plurality of XML subscriptions received from clients coupled to the distribution ring; and to configure the XML appliances/routers in the bidirectional continuous loop to make routing decisions to forward the XML messages to selected clients based on the XML subscriptions such that the bidirectional continuous loop enables the XML messages to travel unidirectionally in opposite directions within the continuous loop until the XML messages arrive at XML appliances/routers having XML subscriptions associated with the XML messages.

14. The network of claim 12, wherein the network management device is adapted to use Simple Network Management Protocol (SNMP) to configure the XML appliances/routers.

15. The network of claim 12, wherein the network management device is implemented as a network management station which is separate from the XML appliances/routers.

16. The network of claim 1, wherein the plurality of XML appliances/routers in the at least one distribution ring loop are configured to check if each received XML message is a duplicate XML message.

17. The network of claim 16, wherein the plurality of XML appliances/routers in the at least one distribution ring are configured to not forward XML messages determined to be duplicate XML messages.

18. A method of distributing XML documents/messages in a network of XML appliances/routers, the network of XML appliances/routers comprising XML appliances/routers implemented as processes in separate physical computer systems interconnected by physical communication links, the XML appliances/routers being configured to make XML routing decisions for XML documents/messages by applying XML subscription information to the XML documents/messages, and the XML appliances/routers being configured to forward the XML documents/messages toward subscribing clients according to the XML subscription information submitted by the subscribing clients, the subscribing clients being network elements other than the XML appliances/routers, the method comprising:

establishing two distribution rings in the network of XML appliances/routers for the distribution of XML documents/messages between the XML appliances/routers, each distribution ring comprising a respective plurality of the XML appliances/routers arranged serially in a respective ring and configured to transmit the XML documents/messages from XML appliance/router to XML appliance/router around the ring, at least one XML appliance/router being common to the two distribution rings;

coupling subsets of subscribing clients to XML appliances/routers on the distribution ring via respective originating XML appliances/routers;

enabling the respective originating XML appliances/routers to transmit/publish XML documents/messages onto the ring; and operating the XML appliances/routers on the distribution ring:
to receive XML subscription information from a respective subset of subscribing clients; to locally apply the subscription information to each XML document/message received on the distribution ring;
to select XML documents/messages to be forwarded toward its subset of subscribing clients without exchanging XML subscription information between the XML appliances/routers; and
to forward the selected XML documents/messages toward subscribing clients according to the XML subscription information submitted by subscribing clients, the at least one XML appliance/router that is common to the two distribution rings being operated to forward an XML document/message received on one of the two distribution rings on both of the two distribution rings.

19. The method of claim 18, wherein the at least one XML appliance/router that is common to the two distribution rings is configured to operate as an originating router with respect to one of the distribution rings for XML documents/messages that it first transmits to that one of the distribution rings.

* * * * *